United States Patent

Sasajima

[11] Patent Number: 5,898,284
[45] Date of Patent: Apr. 27, 1999

[54] VEHICLE SLIDING DOOR OPENING/CLOSING CONTROL DEVICE

[75] Inventor: Kouji Sasajima, Wako, Japan

[73] Assignee: Honda Giken Kogyo Kabushiki Kaisha, Tokyo, Japan

[21] Appl. No.: 08/867,188

[22] Filed: Jun. 2, 1997

[30] Foreign Application Priority Data

Jun. 12, 1996 [JP] Japan ............................ 8-151360

[51] Int. Cl.⁶ ...................................................... H02P 1/00
[52] U.S. Cl. ........................... 318/287; 318/376; 318/565; 318/484
[58] Field of Search ..................... 318/280–300, 318/375–381, 445–459, 464–470, 474–477, 484–487, 565

[56] References Cited

U.S. PATENT DOCUMENTS

| | | | |
|---|---|---|---|
| 4,990,837 | 2/1991 | Ishitobi | 318/375 |
| 5,159,203 | 10/1992 | Gallenschutz et al. | 307/116 |
| 5,396,158 | 3/1995 | Long et al. | 318/282 |
| 5,625,266 | 4/1997 | Stark | 318/466 |

FOREIGN PATENT DOCUMENTS

| | | |
|---|---|---|
| 4-62883 | 5/1992 | Japan . |
| 4-285282 | 10/1992 | Japan . |
| 6-13915 | 2/1994 | Japan . |
| 6-13357 | 4/1994 | Japan . |

*Primary Examiner*—Brian Sircus
*Attorney, Agent, or Firm*—Merchant, Gould, Smith, Edell, Welter & Schmidt, P.A.

[57] ABSTRACT

A vehicle sliding door opening/closing control device includes a trouble detecting circuit for detecting a trouble in a control unit which is used for controlling operation of a motor to drive a vehicle sliding door in opening and closing direction, and switching unit responsive to detection of a trouble in the control unit by the trouble detecting circuit for shorting power input terminals of the motor, and after the lapse of a predetermined time, opening the power input terminals of the motor. Upon detection of the trouble in the control unit, the power input terminals of the motor are shorted so that the motor is kept in a locked state. In this instance, if the sliding door is moving at a high speed, it is possible to apply braking to the sliding door. Thereafter, after the lapse of the predetermined time, the switching unit opens the power input terminals of the motor to release a lock on the motor, thereby allowing the sliding door to be displaced by manual.

8 Claims, 4 Drawing Sheets

VEHICLE SLIDING DOOR OPENING/CLOSING CONTROL DEVICE

BACKGROUND OF THE INVENTION

1. Field of the Invention

The present invention relates to an opening/closing control device for controlling the opening and closing of a sliding door of a motor vehicle.

2. Description of the Related Art

Sliding door opening/closing control devices having a motor for driving a sliding door in opening and closing direction to open and close an opening in the body of a motor vehicle are known as disclosed, for example, in Japanese Utility Model Laid-Open Publications Nos. HEI 4-62883 and HEI 6-13915, Japanese Utility Model Publication No. HEI 6-13357 and Japanese Patent Laid-Open Publication No. HEI 4-285282. These known opening/closing control devices generally include a central processing unit (CPU) for controlling the operation of a motor for driving a door in opening and closing directions, a battery for supplying power to the CPU, a ROM containing a control program, and a RAM for storing data. The CPU executes program control of the motor by carrying out at a high speed the high-level computation necessary for controlling complicated opening and closing movements of the door.

When the CPU encounters trouble such as an operation failure, a control circuit or a power circuit in the sliding door opening/closing control device is immediately stopped, and operation of the sliding door is changed over or shifted to the manual mode to thereby insure at least movement of the sliding door manually.

However, in the case where such trouble in the CPU occurs during relatively high speed movement of the sliding door, if operation of the sliding door is immediately changed to the manual mode, it poses the problem that the sliding door still keep moving in the same direction by the effect of inertial force.

SUMMARY OF THE INVENTION

In view of the problems of the related art described above, it is an object of the present invention to provide a vehicle sliding door opening/closing control device which is capable of slowing down or stopping a sliding door when a control unit encounters trouble while the sliding door is moving at a relatively high speed.

According to a first aspect of the present invention, there is provided a vehicle sliding door opening/closing control device which comprises: a trouble detecting circuit for detecting trouble in a control unit which is used for controlling the operation of a motor to drive a sliding door in opening and closing direction; and switching means for, when the trouble detecting circuit detects trouble in the control unit, shorting power input terminals of the motor, and after the lapse of a predetermined time, opening the power input terminals of the motor.

By shorting the power input terminals of the motor in response to detection of the trouble in the control unit, the motor is kept in a locked state. In this instance, if the sliding door is moving at a high speed, a brake is applied to the movement of the sliding door. After the lapse of the predetermined time, the power input terminals of the motor are opened by the switching means so that the lock on the motor is released and the sliding door can be moved manually.

According to a second aspect of the present invention, there is provided a vehicle sliding door opening/closing control device which comprises: a trouble detecting circuit for detecting trouble in a control unit which is used for controlling the operation of a motor to drive a sliding door in opening and closing directions; a pulse signal generating circuit for, when the trouble detecting circuit detects trouble in the control unit, generating a pulse signal having a progressively varying (increasing or decreasing) duty factor; and switching means for shorting power input terminals of the motor such that a shorting time decreases progressively on the basis of the pulse signal.

In response to the detection of trouble in the control unit, a PWM (Pulse Width Modulation) control is performed by using the pulse signal having a progressively varying (increasing or decreasing) duty factor, so that the condition of the power input terminals of the motor is shifted gradually from a shorted state to an open state. Thus, the motor is one brought to a locked state and, thereafter, the locked state of the motor is gradually released. Accordingly, in this instance if the sliding door is moving at a high speed, the sliding door is once decelerated or stopped suddenly. Then, as the locked state of the motor is gradually released, a brake on the sliding door decreases gradually. And eventually, the sliding door is freed from the brake and can be moved manually.

Preferably, the vehicle sliding door opening/closing control device further includes an inhibiting circuit for preventing supply of power from the battery to the motor when the trouble detecting circuit detects trouble in the control unit. By thus stopping supply of power from the battery to the motor, the motor is no longer possible to provide an unnecessary or a forcible power assist to the opening and closing of the sliding door.

The above and other objects, features and advantages of the present invention will become manifest to those versed in the art upon making reference to the detailed description and accompanying sheets of drawings in which a preferred structural embodiment incorporating the principles of the present invention is shown by way of illustrative example.

DETAILED DESCRIPTION OF THE PREFERRED EMBODIMENTS

One preferred embodiment of the invention will be described below in greater detail with reference to the accompanying drawings.

Figure 1:
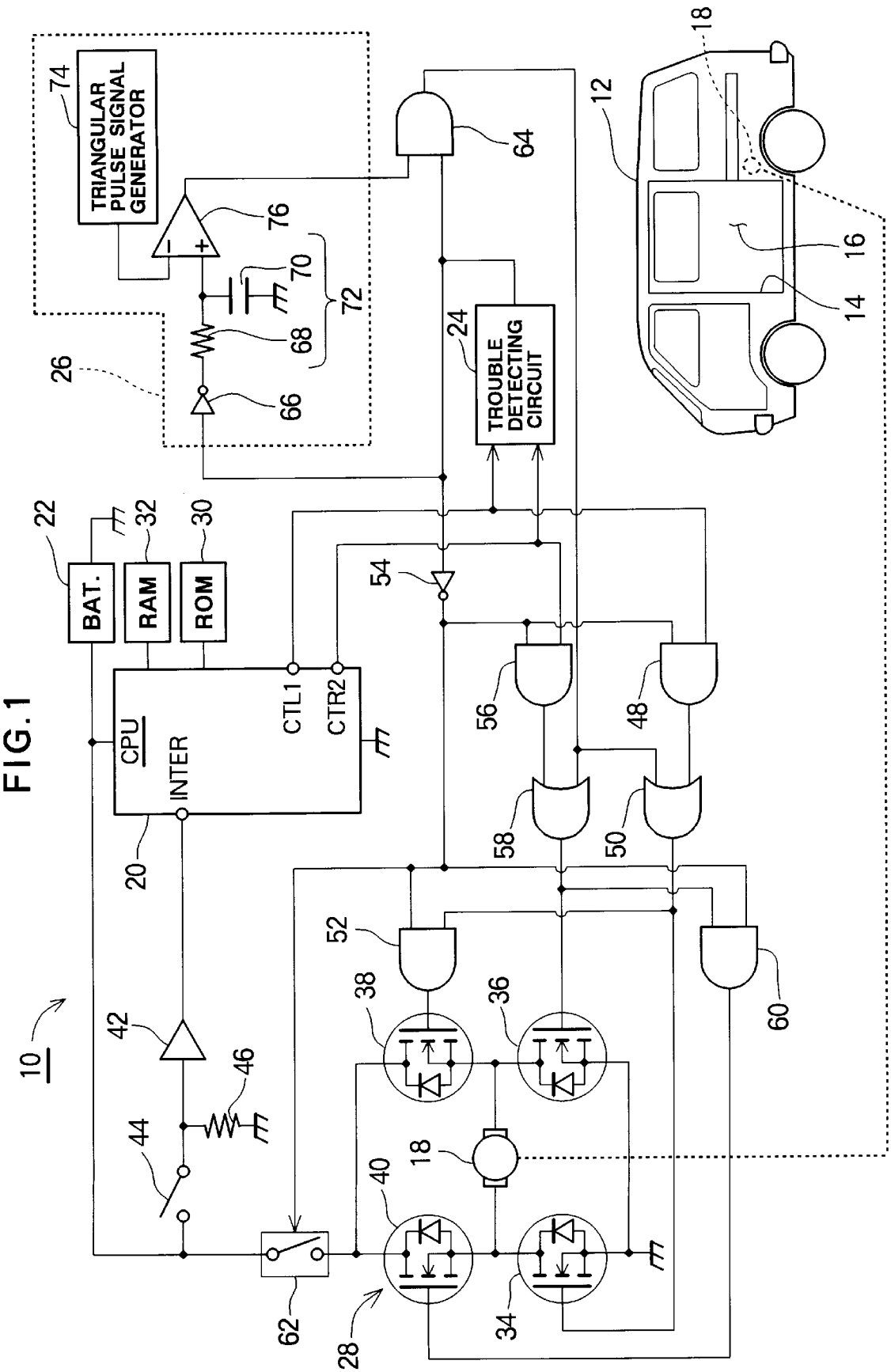
FIG. 1 is a schematic circuit diagram of a vehicle sliding door opening/closing control device according to one preferred embodiment of the invention.

FIG. 1 shows together with a vehicle body a circuit diagram of a vehicle sliding door opening/closing control device embodying the present invention. The opening/closing control device 10 comprises a drive motor 18 for driving in opening and closing directions a horizontal sliding door 16 which opens and closes an opening 14 defined in the body 12 of a vehicle, a control unit 20 for controlling the operation of the drive motor 18, a battery 22 for supplying power to the control unit 20 and the drive motor 18, a trouble detecting circuit 24 for detecting trouble in the control unit 20, a pulse signal generating circuit 26 for, when the trouble detecting circuit 24 detects trouble in the control unit 20, generating a pulse signal having a progressively varying (increasing or decreasing) duty factor or cycle, and a switching means 28 for shorting power input terminals of the drive motor 18 such that shorting time of the drive motor 18 decreases gradually on the basis of the pulse signal.

The drive motor 18 is reversible and is mounted in a predetermined position on the vehicle body 12.

The opening/closing control device 10 is mainly composed of a microcomputer and has a central processing unit (CPU), which constitutes the control unit 20, a ROM (Read-Only Memory) 30 storing a program for controlling the control unit 20, and a RAM (Random Access Memory) 32 for storing various kinds of data.

The switching means or circuit 28 consists of four MOSFETs (Metal Oxide Semiconductor Field Effect Transistors) 34, 36, 38, 40 connected to the two input terminals of the motor 18 in the form of a bridge.

The CPU (control unit) 20 has an interrupt terminal INTER connected via a non-inverting amplifier (hereinafter referred to as "amplifier") 42 to an operating switch 44. The operating switch 40 may consist of for example a touch sensor of the sliding door 16, a push switch mounted on an inner handle, a pull switch mounted on an outer handle, or a manual switch for driving (opening and closing) or stopping the sliding door 16.

The operating switch 44 is in an OFF state when there is no user-operation input for driving the sliding door 16 to open or close the sliding door 16, and at this time the output of the amplifier 42 is at an L (low) level. When on the other hand there has been a user-operation input for driving the sliding door 16 in an opening or a closing direction, the operating switch 44 is in an ON state and the output of the amplifier 42 goes up to an H (high) level. In FIG. 1, the reference numeral 46 denotes a resistor for eliminating noise.

The CPU 20 monitors the level of the output signal of the amplifier 42 supplied to the interrupt terminal INTER, and when the level of the output signal of the amplifier 42 changes from the L level to the H level, the CPU 20 supplies a control signal from a first control terminal CTL1 or a second control terminal CTL2 to perform control of the motor 18 in a mode corresponding to the position of the operating switch 44 and thereby controls movement of the sliding door 16. For this control of the motor 18, a program stored in the ROM 30 is used.

The trouble detecting circuit 24 detects trouble in the CPU 20 on the basis of a control signal (pulse signal) from the first and second control terminals CTL1, CTL2. When it detects trouble in the CPU 20, the trouble detecting circuit 24 outputs an H level signal. Structural details of the trouble detecting circuit 24 will be described later with reference to FIG. 4.

A control signal (pulse signal) from the first control terminal CTL1 of the CPU 20 is supplied by way of a first AND circuit or gate 48 and a first OR circuit or gate 50 to a control terminal of the first MOSFET 34. At the same time, the control signal is also supplied via the first AND gate 48, the first OR gate 50 and a second AND circuit or gate 52 to a control terminal of the third MOSFET 38. To this end, the first control terminal CTL1 is connected to one of the input terminals of the first AND gate 48. The other input terminal of the first AND gate 48 is connected via a first NOT circuit or gate 54 to an output terminal of the trouble detecting circuit 24. The output terminal of the first AND gate 48 is connected to one of the input terminals of the first OR gate 50, and the output terminal of the first OR gate 50 is connected to the control terminal of the first MOSFET 34 and to one of the input terminals of the second AND gate 52. The other input terminal of the second AND gate 52 is connected via the first NOT gate 54 to the output terminal of the trouble detecting circuit 24. The output terminal of the second AND gate 52 is connected to the control terminal of the third MOSFET 38.

Similarly, a control signal (pulse signal) from the second control terminal CTL2 of the CPU 20 is supplied by way of a third AND circuit or gate 56 and a second OR circuit or gate 58 to a control terminal of the second MOSFET 36. At the same time, the control signal is also supplied via the third AND gate 56, the second OR gate 58 and a fourth AND circuit or gate 60 to a control terminal of the fourth MOSFET 40. To this end, the second control terminal CTL2 is connected to one of the input terminals of the third AND gate 56. The other input terminal of the third AND gate 56 is connected via the first NOT gate 54 to the output terminal of the trouble detecting circuit 24. The output terminal of the third AND gate 56 is connected to one of the input terminals of the second OR gate 58, and the output terminal of the second OR gate 58 is connected to the control terminal of the second MOSFET 36 and to one of the input terminals of the fourth AND gate 60. The other input terminal of the second AND gate 60 is connected via the first NOT gate 54 to the output terminal of the trouble detecting circuit 24. The output terminal of the fourth AND gate 60 is connected to the control terminal of the fourth MOSFET 40.

When the trouble detecting circuit 24 detects trouble in the CPU 20, in order to prevent supply of power from the battery 22 to the motor 18, the output signal of the trouble detecting circuit 24 is supplied via the first NOT gate 54 to an inhibiting circuit 62. The inhibiting circuit 62 comprises a relay disposed between the battery 22 and the motor 18, and more particularly between the battery 22 and the switching means 28.

To secure that when the trouble detecting circuit 24 detects trouble in the CPU 20, the power input terminals of the motor 18 are shorted in a desired manner, the output signal of the trouble detecting circuit 24 and the pulse signal of the pulse signal generating circuit 26 are supplied via a fifth AND circuit or gate 64 and the first and second OR gates 50, 58 to the respective control terminals of the first and second MOSFETs 34, 36. To this end, one of the input terminals of the fifth AND gate 64 is connected to the output terminal of the trouble detecting circuit 24, and the other input terminal of the fifth AND gate 64 is connected to an output terminal of the pulse signal generating circuit 26. The output terminal of the fifth AND gate 64 is connected to the other input terminal of each of the first and second OR gates 50, 58.

The pulse signal generating circuit 26 comprises a second NOT circuit or gate 66 connected to the output terminal of the trouble detecting circuit 24, an RC circuit 72 containing a resistance 68 and a capacitor 70, the resistance 68 being connected to the output terminal of the second NOT circuit, a triangular pulse signal generator 74 for generating a triangular pulse signal, and a comparator 76 for comparing a signal supplied from the RC circuit 72 with a signal supplied from the triangular pulse signal generator 74 so as to output a pulse signal having a duty cycle or factor which decreases with a decrease in the terminal voltage of the capacitor 70 of the RC circuit 72. The comparator 76 has an inverting input terminal (negative terminal) connected to the output terminal of the triangular pulse signal generator 74, and a non-inverting input terminal (positive terminal) connected to the output terminal of the RC circuit 72.

Operation of the sliding door opening/closing control device 10 will now be described below in greater detail.

When there is a user-operation input for open/close-driving the sliding door 16, the operating switch 44 goes into the ON state and the output of the amplifier 42 rises to the H level. With this signal level change, the CPU 20 supplies a control signal from the first control terminal CTL1 or the second control terminal CTL2 so that the operation of the motor 18 is controlled in a mode corresponding to the instructions from the operating switch 44, so as to control opening and closing movement of the sliding door 16.

The trouble detecting circuit 24, if it does not detect trouble in the CPU 20, outputs a signal at the L level. The L-level output signal is supplied via the second NOT gate 66 and the resistance 68 to the capacitor 70 of the pulse signal generating circuit 26 to charge the capacitor 70. As a result, the non-inverting input terminal (positive terminal) of the comparator 76 rises to the H level. The L-level output signal of the trouble detecting circuit 24 is also supplied to the fifth AND gate 64 so that the output of the fifth AND gate 64 is at the L level. On the other hand, if the output of the first NOT gate 54, which is connected to the trouble detecting circuit 24, is at the H level, then on the basis of this H-level output signal, the respective outputs of the second and fourth AND gates 52, 60 are at the same level as the respective outputs of the first and second OR gates 50, 58. The relay 62 is thus turned on, and so power or electricity is supplied from the battery 22 to the motor 18.

A control signal from the first control terminal CTL1 of the CPU 20 is supplied via the first AND gate 48 and the first OR gate 50 to the control terminal of the first MOSFET 34. At the same time, this control signal is supplied via the first AND gate 48, the first OR gate 50 and the second AND gate 52 to the control terminal of the third MOSFET 38. Thus, the CPU 20 controls rotation of the motor 18 in one direction (for example, in a direction to open the sliding door 16).

Similarly, a control signal from the second control terminal CTL2 of the CPU 20 is supplied via the third AND gate 56 and the second OR gate 58 to the control terminal of the second MOSFET 36. At the same time, this control signal is supplied via the third AND gate 58, the second OR gate 58 and the fourth AND gate 60 to the control terminal of the fourth MOSFET 40. Thus, the CPU 20 controls rotation of the motor 18 in a reverse direction (for example, in a direction to close the sliding door 16).

When the trouble detecting circuit 24 detects trouble in the CPU 20 and thus outputs a H-level signal, the output of first NOT gate 54 is at the L level. On the basis of this L-level output signal, the respective outputs of the first to fourth AND gates 48, 52, 56, 60 are all at L level, and the first to fourth MOSFETs 34, 36, 38, 40 are all in the OFF state. The relay 62 is also brought to the OFF state, and so the supply of power from the battery 22 to the motor 18 is interrupted.

At this time, the output of the second NOT gate 66 of the pulse signal generating circuit 26 shifts from the H level to the L level whereupon in accordance to a time constant of the RC circuit 72 determined by the resistance value of the resistance 68 multiplied by the capacitance of the capacitor 70, the terminal voltage of the capacitor 70 decreases with the result that an input voltage at the non-inverting input terminal (positive terminal) of the comparator 76 decreases progressively. Since the inverting input terminal (negative terminal) of the comparator 76 is connected to the output terminal of the triangular pulse signal generator 74, the comparator 76 outputs a pulse signal having a duty factor or cycle which decreases progressively by changing (or reducing) the pulse width of the triangular pulse signal as the input voltage at the non-inverting input terminal (positive terminal) decreases gradually, as described later with reference to FIGS. 2 and 3.

Figure 2:
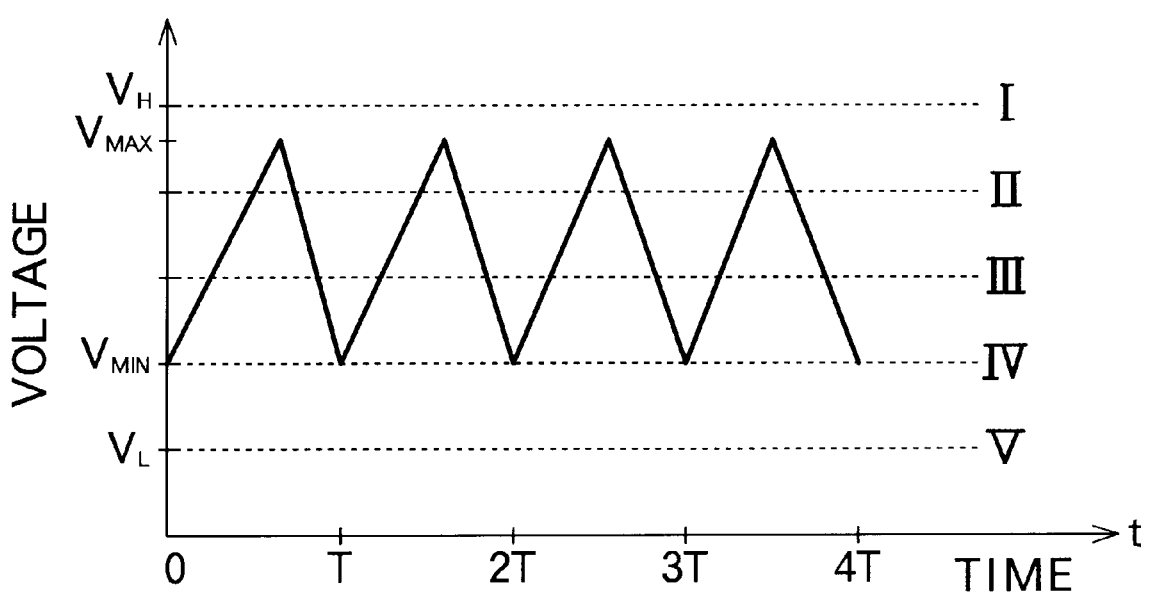
FIG. 2 is a graph showing the relationship between the output voltage of a triangular pulse signal generator and the terminal voltage of a capacitor both used in a pulse signal generating circuit in the opening/closing control device.

FIG. 2 shows a triangular pulse signal (indicated by a thick solid line) generated by the triangular pulse signal generator 74, the pulse signal having a period T. In the same figure, there are also shown by broken lines a plurality of different levels of terminal voltage of the capacitor 70 which decrease in the order of Roman numeration from I to V. In FIG. 2, reference characters $V_{MAX}$ and $V_{MIN}$ correspond respectively to a maximum voltage and a minimum voltage of the triangular pulse signal, and reference characters $V_H$ and $V_L$ correspond to a voltage at the H level and a voltage at the L level, respectively.

Figure 3:
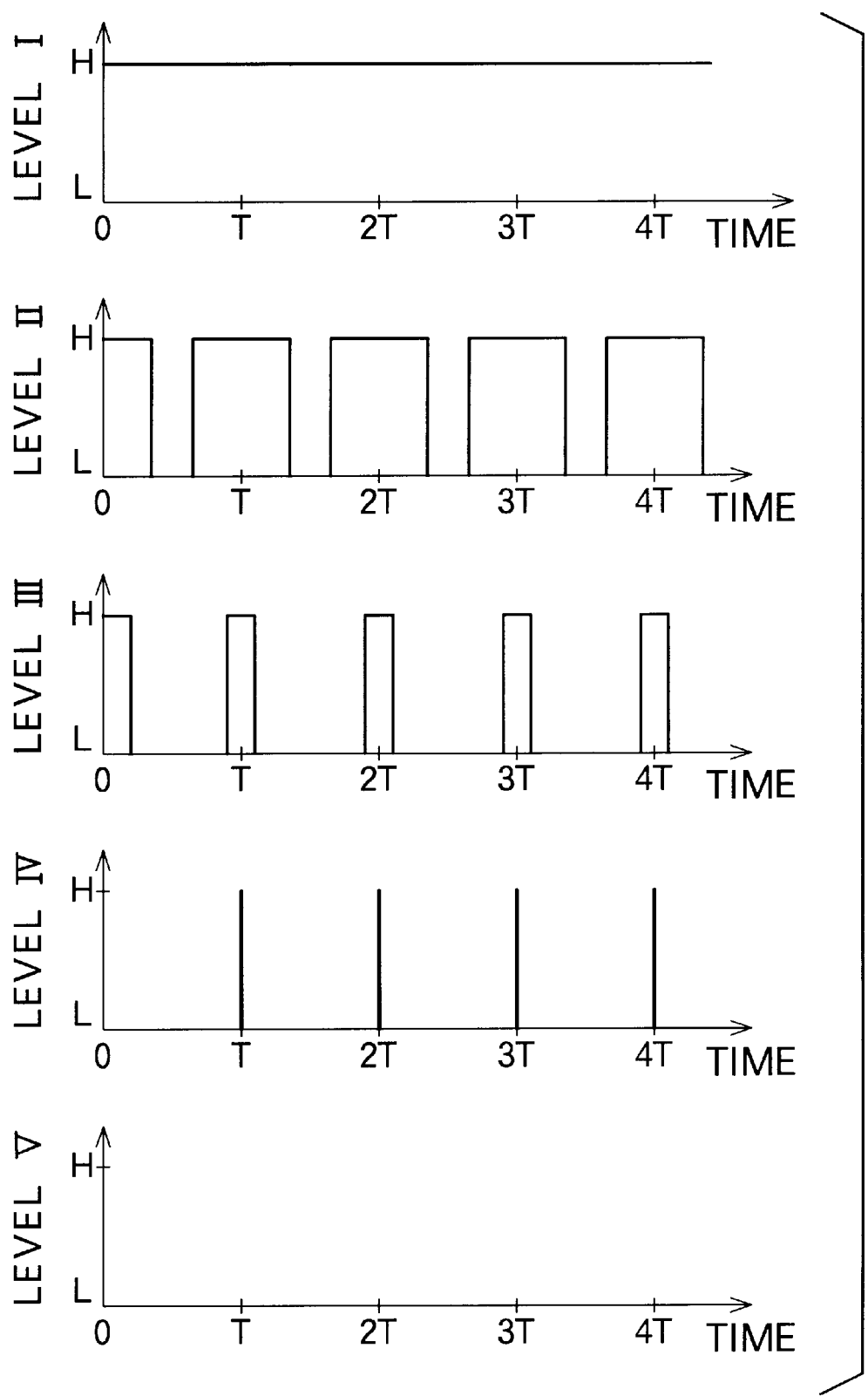
FIG. 3 is a graphical representation showing a change of the duty factor of an output signal from a comparator of the pulse signal generating circuit.

FIG. 3 shows output signals of the comparator 76 which correspond, respectively, to the terminal voltages of the capacitor 70 at the levels I–V indicated by the broken lines shown in FIG. 2. It will be understood from FIG. 3 that the comparator 76 generates a pulse signal having a duty factor or cycle which decreases progressively with a decrease in the terminal voltage of the capacitor 70 when the trouble detecting circuit 24 detects trouble in the CPU 20.

The pulse signal having such a progressively decreasing duty factor is supplied from the comparator 76 via the fifth AND gate 64, and the first and second OR gates 50, 58 to the respective control terminals of the first and second MOSFETs 34, 36. As a result, the power input terminals of the motor 18 are shorted such that a shorting time of the motor power input terminals is reduced or shortened on the basis of the pulse signal supplied to the MOSFETs 34, 36.

Thus, when trouble in the CPU (control unit) 20 is detected, a PWM (Pulse Width Modulation) control is performed using a pulse signal having a progressively decreasing duty factor or cycle such that the power input terminals of the motor 18 are changed gradually from the locked condition or state to the open condition or state, and by this means, the motor 18 is once set in a locked condition and this locked condition is gradually released thereafter. Accordingly, in this instance (at the time of detection of the trouble in the CPU 20), if the sliding door 16 is moving at a high speed, the sliding door is quickly decelerated or stopped and after that as the locked condition of the motor 18 is gradually released, a brake on the sliding door is gradually reduced and finally the sliding door 16 is freed from locking and hence can be moved manually. Additionally, when there is trouble in the CPU 20, the supply of power from the battery 22 to the motor 18 is stopped or interrupted by the relay 62 being kept in the OFF state, so the motor 18 will not apply an unnecessary or forcible power assist to the opening and closing of the sliding door 16.

It is possible, according to the present invention, to set the output of the triangular pulse signal generator 74 at a constant voltage intermediate between the maximum voltage $V_{MAX}$ and the minimum voltage $V_{MIN}$, so that the comparator 76 supplies to the control terminals of the first and second MOSFETs 34, 36 a signal which shifts from the H level to the L level after the lapse of a predetermined period of time. In this case, upon detection of trouble in the CPU (control unit) 20, the power input terminals of the motor 18 are shorted and by this means the motor 18 is kept in the locked condition or state. In this instance, if the sliding door 16 is moving at a high speed, the brake is applied to the movement of the sliding door 16. Thereafter, after the lapse of a predetermined time, the power input terminals of the motor 18 are opened and, hence, the locked state of the motor 18 disappears. Now the sliding door can be manually displaced. The predetermined time can be set on the basis of the time constant of the RC circuit 72 which is determined by the resistance value of the resistance 68 and the capacitance of the capacitor 70.

As a variant of the foregoing embodiment, the pulse signal generating circuit 26 may be constructed such that the input terminals of the comparator 76 are reversed, i.e., the non-inverting input terminal (positive terminal) is connected to the output terminal of the triangular pulse signal generator 74, while the inverting input terminal (negative terminal) is connected to one end of the capacitor 70 of the RC circuit 72. With this construction, the pulse signal generating circuit 26, responsive to the detection of trouble in the CPU 20, can generate a pulse signal having a gradually increasing duty factor or cycle. In this case, the control signals supplied from the first and second control terminals CTL1, CTL2 of the CPU 20 should be inverted, the output signal from each of the second and fourth AND gates 52, 60 should be also inverted, and the first and second MOSFETs 34, 36 should be p-channel MOSFETs. Such a modification ensures that the power input terminals of the motor 18 are shorted such that a shorting time of the motor power input terminals reduces gradually on the basis of the pulse signal.

Figure 4:
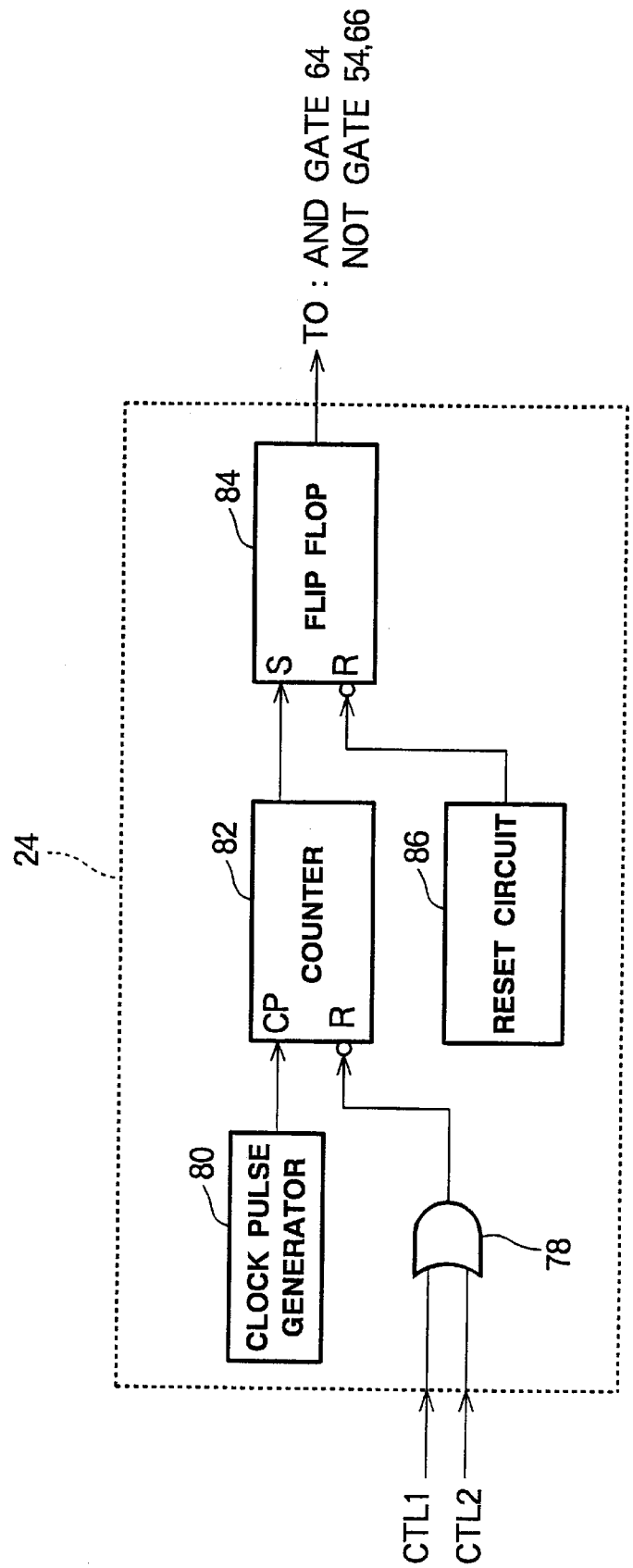
FIG. 4 is a block diagram showing a trouble detecting circuit of the opening/closing control device.

Referring now to FIG. 4, there is shown an example of the circuit arrangement of the trouble detecting circuit 24. The trouble detecting circuit 24 comprises a third OR circuit or gate 78 having input terminals to which the control signals (pulse signals) of the first and second control terminals CTL1, CTL2 of the CPU 20 are supplied, an oscillator circuitry (clock pulse generator) 80 for generating a train of clock pulse signals of high frequency, a counter circuit 82 for counting the clock pulse signals received from the clock pulse generator 80, a RS flip-flop 84 adapted to be set by an output signal (pulse signal) supplied from the counter circuit 82, and a reset circuit 86 for resetting the RS flip-flop 84. The output terminal of the third OR gate 76 is connected to the reset terminal of the counter circuit 82 so that while at least one of the control signals from the first and second control terminals CTL1, CTL2 of the CPU 20 are at the L level, the counter 82 is reset. The reset circuit 86 is composed of a key switch used in combination with an ignition key. The key switch 86 while in the ON state outputs a signal at the L level and while in the OFF state outputs a signal at the H level.

With the trouble detecting circuit 24 thus arranged, while the output of third OR gate 87 is at the L level (i.e., while the control signals from the first and second control terminals CTL1, CTL2 of the CPU 20 are at the L level), the counter 82 is reset and the output of the counter 82 is at the L level. The L-level output signal from the counter 82 is supplied to the fifth AND gate 64 and the first and second NOT gates 54, 66.

While the control signals remain at the H level, the counter 82 counts the high-frequency clock pulse signals received from the clock pulse generator 80. If when the time period in which the control signals remain at the H level comes to an end, counting by the counter 52 has finished at the predetermined count set in advance, the output of the counter 82 remains at the L level. Conversely, if at the end of the time period in which the control signals remain at the H level, the counter 82 has finished its counting at a value other than the predetermined count, then the counter 82 outputs a pulse signal to the S (set) terminal of the RS flip-flop. As a result, the output of the RS flip-flip 84 shifts from the L level to the H level and by this means trouble in the CPU 20 is detected.

Thus, the trouble detecting circuit 24, upon detection of the trouble in the CPU 20, supplies an H-level signal to the fifth AND gate 64 and the first and second NOT gates 54, 66. When the reset circuit 86 composed of an ignition switch is switched off (when the engine of a vehicle is stopped), it supplies an H-level signal to the R (reset) terminal of the RS flip-flop 84 to reset the RS flip-flop 84.

Obviously, various minor changes and modifications of the present invention are possible in the light of the above teaching, it is therefore to be understood that within the scope of the appended claims the invention may be practiced otherwise than as specifically described.

What is claimed is:

1. A vehicle sliding door opening/closing control device for controlling the movement of a sliding door which opens and closes an opening defined in the body of a vehicle, comprising:

a motor for driving the sliding door in opening and closing directions;

a battery for supplying power to said motor;

a control unit for controlling the operation of said motor;

a trouble detecting circuit for detecting trouble in said control unit;

switching means for, when said trouble detecting circuit detects trouble in said control unit, shorting power input terminals of said motor, and after a lapse of time, opening the power input terminals of said motor, said switching means including a pulse signal generating circuit, said pulse signal generating circuit including a triangular pulse signal generator for generating a triangular pulse signal, an RC circuit containing a resistance and a capacitance, and a comparator for comparing said triangular pulse signal with a terminal voltage of said capacitance of said RC circuit so as to generate a pulse signal having a constant voltage.

2. A vehicle sliding door opening/closing control device according to claim 1, wherein said trouble detecting circuit includes a counter for counting sequential control pulse signals received from said control unit so as to output, according to the number of control pulse signal received, a pulse signal indicative of trouble in said control unit, and a flip-flop adapted to be set by said pulse signal from said counter.

3. A vehicle sliding door opening/closing control device according to claim 1, further including an inhibiting circuit for, when said trouble detecting circuit detects trouble in said control unit, preventing supply of power from said battery to said motor.

4. A vehicle sliding door opening/closing control device for controlling the movement of a sliding door which opens and closes an opening defined in the body of a vehicle, comprising:

a motor for driving the sliding door in opening and closing directions;

a battery for supplying power to said motor;

a control unit for controlling the operation of said motor;

a trouble detecting circuit for detecting trouble in said control unit;

a pulse signal generating circuit for, when said trouble detecting circuit detects trouble in said control unit, generating a pulse signal having a progressively varying duty factor; and switching means for shorting power input terminals of said motor such that a shorting time decreases progressively on the basis of said pulse signal.

5. A vehicle sliding door opening/closing control device according to claim 5, wherein said trouble detecting circuit includes a counter for counting sequential control pulse signals received from said control unit so as to output, according to the number of control pulse signal received, a pulse signal indicative of trouble in said control unit, and a flip-flop adapted to be set by said pulse signal from said counter.

6. A vehicle sliding door opening/closing control device according to claim 4, wherein said pulse signal generating circuit includes a triangular pulse signal generator for generating a triangular pulse signal, an RC circuit containing a resistance and a capacitance and having a terminal voltage of said capacitance which decreases with a time constant determined by a resistance value of said resistance multiplied by a capacitance value of said capacitor, and a comparator for comparing said triangular pulse signal with said terminal voltage of said capacitance of said RC circuit so as to generate a pulse signal having a progressively varying duty factor.

7. A vehicle sliding door opening/closing control device according to claim 6, wherein said comparator having an inverting input terminal connected to an output terminal of said triangular signal pulse generator, and a non-inverting input terminal connected to one end of said capacitor of said RC circuit.

8. A vehicle sliding door opening/closing control device according to claim 4, further including an inhibiting circuit for, when said trouble detecting circuit detects trouble in said control unit, preventing supply of power from said battery to said motor.

* * * * *